(12) United States Patent
Hakoda et al.

(10) Patent No.: US 11,520,453 B2
(45) Date of Patent: Dec. 6, 2022

(54) INFORMATION PROCESSING APPARATUS, PROGRAM, AND SYSTEM FOR A DISPLAY CAPABLE OF DETERMINING CONTINUOUS OPERATION AND RANGE DETERMINATION OF MULTIPLE OPERATORS OPERATING MULTIPLE OBJECTS

(71) Applicant: FUJITSU LIMITED, Kawasaki (JP)

(72) Inventors: Arika Hakoda, Kawasaki (JP); Koki Hatada, Kawasaki (JP); Junichi Yura, Kawasaki (JP); Kazuki Matsui, Kawasaki (JP); Tatsuro Matsumoto, Yokohama (JP); Masahide Noda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/173,228

(22) Filed: Feb. 11, 2021

(65) Prior Publication Data

US 2021/0255740 A1 Aug. 19, 2021

(30) Foreign Application Priority Data

Feb. 17, 2020 (JP) .............................. JP2020-024492

(51) Int. Cl.
*G06F 3/044* (2006.01)
*G06F 3/0354* (2013.01)
*G06F 3/04883* (2022.01)

(52) U.S. Cl.
CPC ........ *G06F 3/0447* (2019.05); *G06F 3/03545* (2013.01); *G06F 3/04883* (2013.01)

(58) Field of Classification Search
None
See application file for complete search history.

(56) References Cited

U.S. PATENT DOCUMENTS 8,407,606 B1 * 3/2013 Davidson ............ G06F 3/04842
345/173
9,736,137 B2 * 8/2017 Thompson .............. G06F 3/041
(Continued)

FOREIGN PATENT DOCUMENTS

| JP | 2014-044735 A | 3/2014 |
| JP | 2014-153792 A | 8/2014 |

(Continued)

OTHER PUBLICATIONS

Extended European Search Report dated Jul. 2, 2021 for corresponding European Patent Application No. 21158283.2, 10 pages.

*Primary Examiner* — Amare Mengistu
*Assistant Examiner* — Sarvesh J Nadkarni
(74) *Attorney, Agent, or Firm* — Fujitsu Patent Center

(57) ABSTRACT

A plurality of objects are arranged over a screen and are operable by a plurality of operators. Determinations are made regarding whether a first object, and a second object operated after the first object, are continuously operated or whether a relationship between the first object and the second object is within a predetermined range. An operation setting of the first object is set as an operation setting of the second object in a case where the operations are performed continuously or in a case where the relationship is within the predetermined range.

18 Claims, 21 Drawing Sheets

(56) References Cited

U.S. PATENT DOCUMENTS

| | | | |
|---|---|---|---|
| 2005/0183035 A1* | 8/2005 | Ringel | G06F 3/0481 |
| | | | 715/811 |
| 2009/0225040 A1* | 9/2009 | Whytock | G06F 3/0488 |
| | | | 345/173 |
| 2009/0327886 A1* | 12/2009 | Whytock | G06F 3/0421 |
| | | | 715/702 |
| 2010/0201636 A1* | 8/2010 | Kikin-Gil | G06F 3/04883 |
| | | | 345/173 |
| 2018/0011630 A1 | 1/2018 | Kim et al. | |
| 2018/0046345 A1* | 2/2018 | Elhard | G06F 3/04845 |

FOREIGN PATENT DOCUMENTS

| | | |
|---|---|---|
| JP | 2015-049661 A | 3/2015 |
| WO | 2013/000944 A1 | 1/2013 |

\* cited by examiner

FIG. 4

| ID | TYPE | POSITION | SIZE | ANGLE | COLOR | THICKNESS | OPERATION SETTING ||||
|---|---|---|---|---|---|---|---|---|---|---|
| | | | | | | | CONVERSION MODE | FONT TYPE | FONT SIZE | CLIPBOARD |
| A | CARD | (x5,y5) | 5×5 | 0 | RED | 1 | ALPHANUMERIC CHARACTER | GOTHIC | 11 | - |
| B | NOTE | (x6,y6) | 6×3 | 15 | BLUE | 2 | JAPANESE CHARACTER | MINCHO | 12 | AAA |
| ... | ... | ... | ... | ... | ... | ... | ... | ... | ... | ... |

| ID | OPERATION START TIME | OPERATION START POSITION | OPERATION END TIME | OPERATION END POSITION |
|---|---|---|---|---|
| A | 6/18/2017 10:10:10.11 | (x1,y1) | 6/18/2017 10:10:15.45 | (x2,y2) |
| B | 6/18/2017 10:10:16.30 | (x3,y3) | | |
| ... | ... | ... | ... | ... |

INFORMATION PROCESSING APPARATUS, PROGRAM, AND SYSTEM FOR A DISPLAY CAPABLE OF DETERMINING CONTINUOUS OPERATION AND RANGE DETERMINATION OF MULTIPLE OPERATORS OPERATING MULTIPLE OBJECTS

CROSS-REFERENCE TO RELATED APPLICATION

This application is based upon and claims the benefit of priority of the prior Japanese Patent Application No. 2020-24492, filed on Feb. 17, 2020, the entire contents of which are incorporated herein by reference.

FIELD

The embodiments discussed herein are related to an information processing apparatus, an information processing program, and an information processing system.

BACKGROUND

In the related art, a technique for converting a graphical user interface (GUI) of an installed application between pieces of information equipment having different types and specifications of input devices and output devices has been disclosed. In this technique, an evaluation scale of the operability of the GUI is calculated according to a time for completing an operation task for an object included in a GUI area. Japanese Laid-open Patent Publication No. 2015-49661 is an example of the related art.

In a meeting using information equipment where multiple people participate, there is a case where an operator performs an operation of writing a character, a figure, or the like to an object such as an electronic sticky note arranged over a screen. For example, in a case where a plurality of objects are arranged over a relatively large screen, a plurality of operators may perform operations on different objects at substantially the same timing.

In a case where the operator performs an operation on an object, for example, operation settings such as the color and thickness of a line to be written to the object are applied. It is preferable that the operation setting is set for each operator in order to, for example, identify the operator who has performed an operation on an object and reflect the operator's preference. For example, in a case where the same operator performs operations on a plurality of different objects, it is preferable that the operation setting is taken over between the objects.

SUMMARY

According to an aspect of the embodiments, an information processing apparatus includes: a memory, and a processor coupled to the memory and configured to: determine, among a plurality of objects which are arranged over a screen and are operable by a plurality of operators, whether a first object and a second object operated after the first object are continuously operated, or whether a relationship between the first object and the second object is within a predetermined range as a close range; and set an operation setting of the first object as an operation setting of the second object in a case where the operations are performed continuously, or in a case where the relationship is within the predetermined range.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of an object information table according to each embodiment;

FIG. 5 is a diagram illustrating an example of an operation history table according to each embodiment;

DESCRIPTION OF EMBODIMENTS

In a case where the operation setting is set for each operator, for example, it is considered that the operator is specified by identification information on the equipment used when an operation is performed on an object such as an electronic pen, or by face detection processing on an image of the operator captured by photographing equipment, and the operation setting is set for each specified operator. However, in this case, since the equipment for specifying the operator is used, and processing for specifying the operator is also performed, there is a problem that the configuration and processing of the system for taking over the operation setting are complicated. In the technique for converting the GUI described above, taking over the operation setting between objects is not considered in the first place.

As one aspect, an object of the disclosed technique is to take over (or take on) an operation setting between objects without using equipment for specifying an operator.

Hereinafter, examples of an embodiment of the disclosed technique will be described in detail with reference to the accompanying drawings.

First Embodiment

Figure 1:
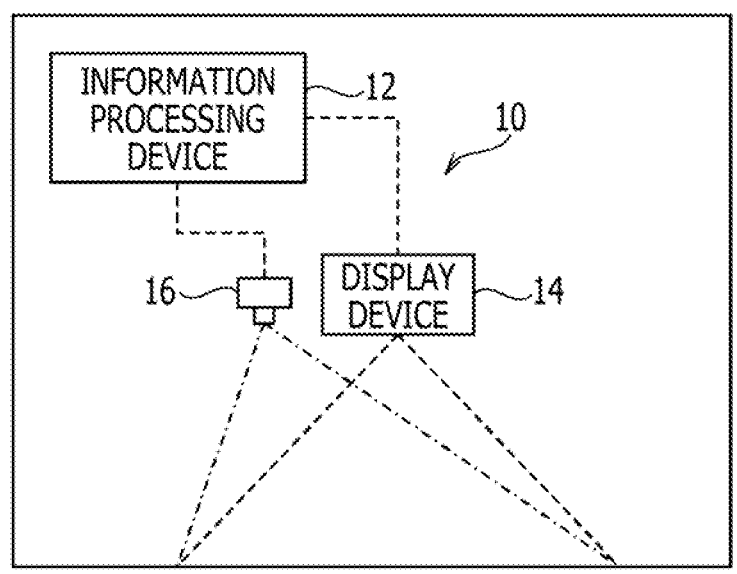
FIG. 1 is a block diagram illustrating a schematic configuration of an information processing system according to each embodiment.

With reference to FIG. 1, a configuration of an information processing system 10 according to the embodiment will be described. As illustrated in FIG. 1, the information processing system 10 includes an information processing device 12, a display device 14, and an imaging device 16. Examples of the information processing device 12 include information processing devices such as a personal computer or a server computer.

The display device 14 performs display by projecting a screen on a display surface such as a wall of a conference room, a whiteboard, or an upper surface of a top plate of a desk, for example, under the control by the information processing device 12. Examples of the display device 14 include a projector. Although details will be described later, a plurality of objects to be operated by an operator are drawn and arranged over a screen displayed by the display device 14.

In the embodiment, the operator performs an operation of writing or the like an object such as a character or a figure on the object by using an electronic pen that emits infrared rays from a tip end portion, a finger of the operator, or the like. For example, in a case of starting an operation on the object, the operator brings the tip end portion of the electronic pen, the finger, or the like into contact with the screen. The operator performs an operation on the object in a state where the tip end portion of the electronic pen, the finger, or the like is in contact with the screen, and in a case of ending the operation, the operator releases the tip end portion of the electronic pen, the finger, or the like from the screen.

The imaging device 16 includes an imaging unit capable of imaging infrared rays, and detects the operation by the operator on a plurality of objects arranged over the screen by imaging an imaging region including the screen displayed by the display device 14 at a predetermined frame rate. The imaging device 16 outputs a signal representing an image obtained by imaging to the information processing device 12. Examples of the imaging device 16 include a digital camera capable of imaging infrared rays. The imaging device 16 is an example of a detection device of the disclosed technique.

Figure 2:
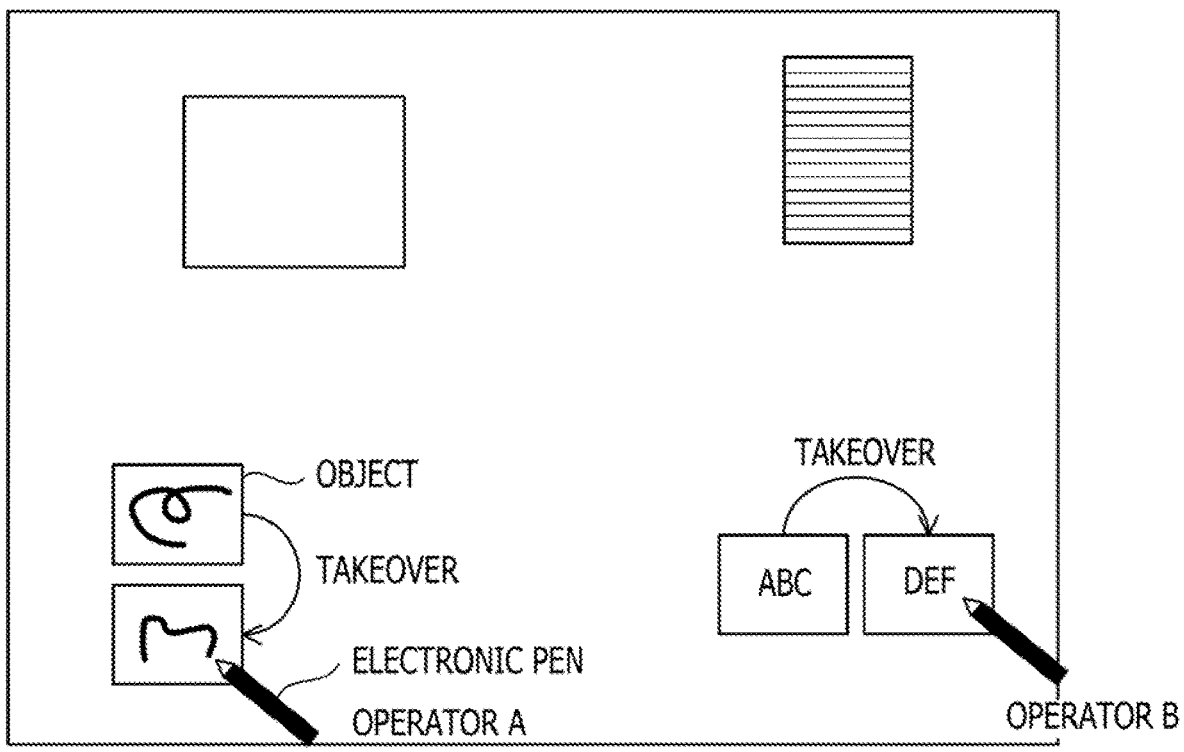
FIG. 2 is a diagram for describing takeover of an operation setting of an object according to each embodiment.

As illustrated in FIG. 2 as an example, a plurality of objects to be operated by the operator are drawn and arranged over the screen displayed by the display device 14. Over the screen, a plurality of operators may perform operations on different objects at substantially the same time. In this case, when a single operator continuously performs an operation on a plurality of different objects, it is preferable that the operation setting is taken over between the objects in order to smoothly progress the meeting.

The information processing device 12 according to the embodiment determines whether to take over the operation setting between the objects based on the continuity of the operation on the plurality of objects and a relationship between the plurality of objects.

Figure 3:
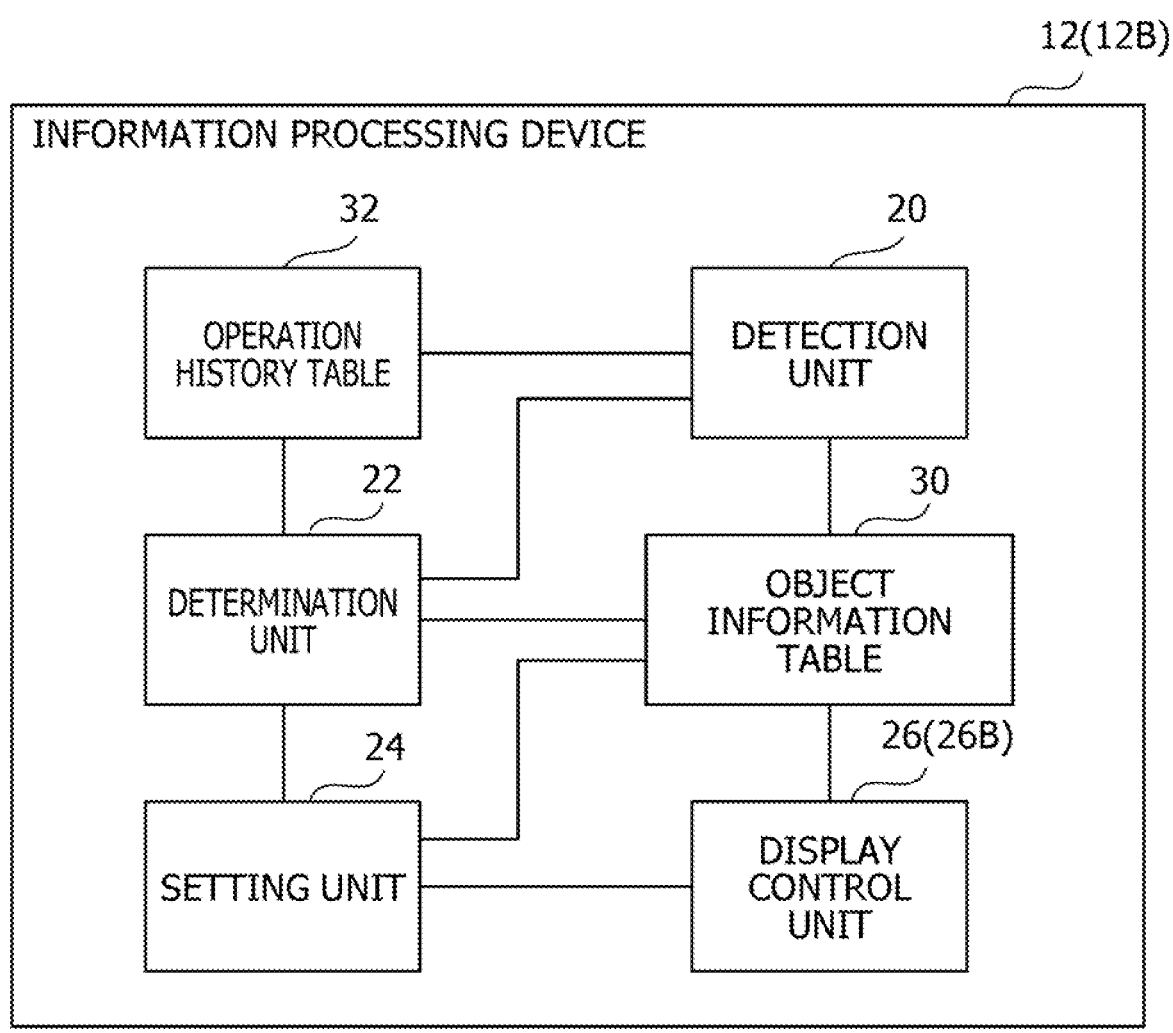
FIG. 3 is a functional block diagram of an information processing device according to first and third embodiments.

Next, with reference to FIG. 3, a functional configuration of the information processing device 12 according to the embodiment will be described. As illustrated in FIG. 3, the information processing device 12 includes a detection unit 20, a determination unit 22, a setting unit 24, and a display control unit 26. An object information table 30 and an operation history table 32 are stored in a predetermined storage area of the information processing device 12.

FIG. 4 illustrates an example of the object information table 30. The object information table 30 is a table in which information on objects arranged over the screen displayed by the display device 14 is stored.

As illustrated in FIG. 4, the object information table 30 stores, for each object, an ID, a type, a position, a size, and an angle as examples of the identification information of the object. The object information table 30 stores, for each object, the operation setting set for the object. Examples of the type of the object include a rectangular card such as an electronic sticky note, a note with ruled lines, an image, and an electronic simile paper.

The position of the object according to the embodiment is represented by two-dimensional coordinates (for example, xy coordinates) of a predetermined position (center position in the embodiment) of the object with a predetermined position such as one of four corners or the center of the screen, as the origin. The size of the object according to the embodiment is represented by the longitudinal length and the lateral length of the object. The angle of the object according to the embodiment is represented by an angle of one side of the object with respect to one direction (for example, x-axis direction) over the screen.

The operation setting in the object information table 30 includes the color and thickness of a line drawn on the screen by an operation on the object by the operator. The operation setting also includes a conversion mode for converting a handwritten character drawn by an operation on the object performed by the operator into a mechanical character, and the type and size of a font for the mechanical character. The operation setting includes information held in a clipboard for pasting when a paste operation is performed on the object. The operation setting may be stored in a table different from the object information table 30 in association with the IDs of the objects.

The object is created, for example, when the operator performs an operation of drawing a predetermined figure (for example, a triangle) over the screen using an electronic pen, a finger, or the like, or an operation of selecting a specific menu, and information on the created object is stored in the object information table 30. In this case, the operation setting of the object may be set as predetermined initial setting or may be set by the operator who has created the object.

FIG. 5 illustrates an example of the operation history table 32. The operation history table 32 is a table in which histories of operations performed on the object by each of a plurality of operators who perform operations on one screen are stored.

As illustrated in FIG. 5, the operation history table 32 stores an ID of an object, a time when an operator starts an operation on the object having the ID (hereinafter, referred to as "operation start time"), and a position where the operator starts the operation on the object having the ID (hereinafter, referred to as an "operation start position"). Further, the operation history table 32 stores a time when the operation on the object having the ID by the operator is ended (hereinafter, referred to as "operation end time"), and a position where the operation on the object having the ID by the operator is ended (hereinafter, referred to as an "operation end position").

Similar to the position of the object described above, the operation start position and the operation end position according to the embodiment are represented by two-dimensional coordinates with a predetermined position such as one of four corners or the center of the screen, as the origin.

The detection unit 20 detects the operation start time and the operation start position based on a signal input from the imaging device 16. The detection unit 20 detects the operation end time and the operation end position based on a signal input from the imaging device 16. The detection unit 20 also detects a trajectory of the operation from the operation start position to the operation end position.

The detection unit 20 specifies the object as the operation target based on the detected operation start position and the position and size of the object in the object information table 30. Then, the detection unit 20 stores the ID of the specified object in association with the detected operation start time, the detected operation start position, the detected operation end time, and the detected operation end position, in the operation history table 32.

In a case where the operation start position is within the same object as the previous one and the operation start time is within a predetermined period (for example, 1 second) from the previous operation end time, the detection unit 20 may store the operation at the operation start position within the same object as the previous one and the operation start time within the predetermined period from the previous operation end time, as one record in the operation history table 32 without detecting the operation as a new operation start.

In a case where the start of the operation on an object is detected by the detection unit 20, the determination unit 22 determines whether or not, before the object, there is an object that has been operated continuously with the object. The object from which the operation start is detected corresponds to a second object of the disclosed technique.

Figure 6:
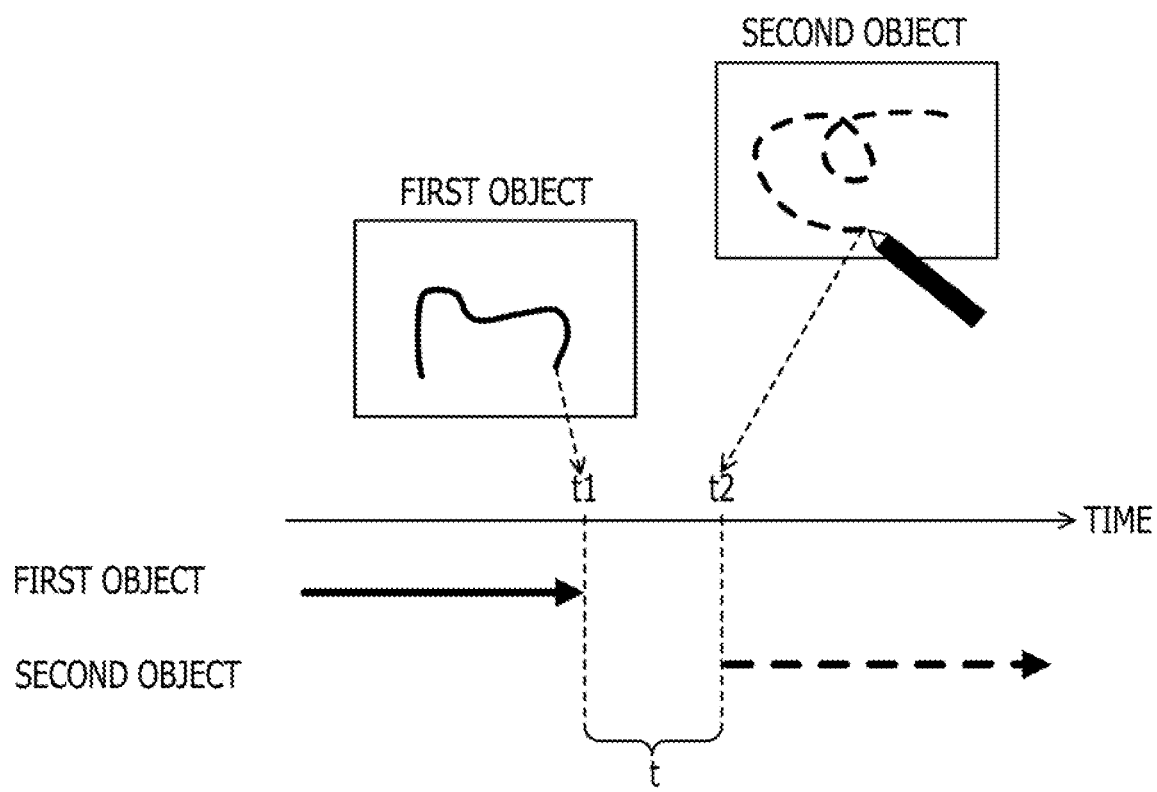
FIG. 6 is a diagram for describing a time interval between an end of an operation on a first object and a start of an operation on a second object.

For example, as illustrated in FIG. 6, the determination unit 22 performs the following determination for an object of which the operation end time t1 is earlier than the operation start time t2 of an object from which the operation start is detected, by referring to the operation history table 32. For example, in this case, the determination unit 22 determines whether or not there is an object for which a time interval t (t=t2−t1) between the operation start time t2 and the operation end time t1 is equal to or smaller than a threshold TH1 (for example, 1 second), by referring to the operation history table 32. The object of which the operation end time t1 is earlier than the operation start time t2 of the object from which the operation start is detected corresponds to a first object of the disclosed technique.

Figure 7:
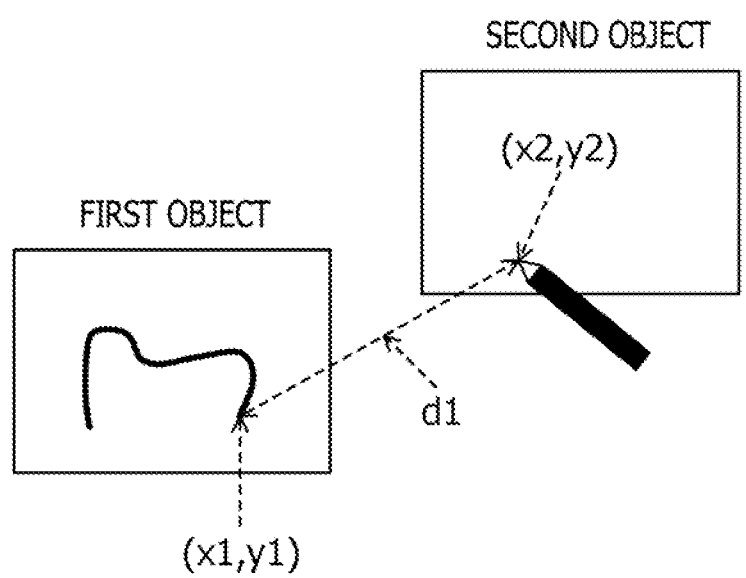
FIG. 7 is a diagram for describing a distance between a position at which an operation on the first object is ended and a position at which an operation on the second object is started.

As illustrated in FIG. 7, the determination unit 22 determines whether or not a distance d1 between the operation end position of the first object having the time interval t equal to or smaller than the threshold TH1 and the operation start position of the second object is equal to or smaller than a threshold TH2 (for example, 30 cm), by referring to the operation history table 32. The distance d1 is calculated according to the following Expression (1). In Expression (1), x1 and y1 represent an x coordinate and a y coordinate of the operation end position of the first object, and x2 and y2 represent an x coordinate and a y coordinate of the operation start position of the second object.

$$d1=\sqrt{(y2-y1)^2+(x2-x1)^2} \quad (1)$$

The determination unit 22 determines that the first object and the second object of which the time interval t is equal to or smaller than the threshold TH1 and the distance d1 is equal to or smaller than the threshold TH2 are continuously operated. The determination unit 22 may determine that the first object and the second object are continuously operated in a case where the time interval t is equal to or smaller than the threshold TH1 or in a case where the distance d1 is equal to or smaller than the threshold TH2. The threshold TH1 and the threshold TH2 may be proportional to each other. In this case, for example, the larger the value of the threshold TH1, the larger the value of the threshold TH2.

The determination unit 22 determines whether or not the relationship between the first object and the second object that are determined to be continuously operated is within a range R predetermined as a close range, by referring to the object information table 30. The determination unit 22 according to the embodiment determines whether or not the relationship is within the range R based on the positional relationship and the type of the first object and the second object.

Figure 8:
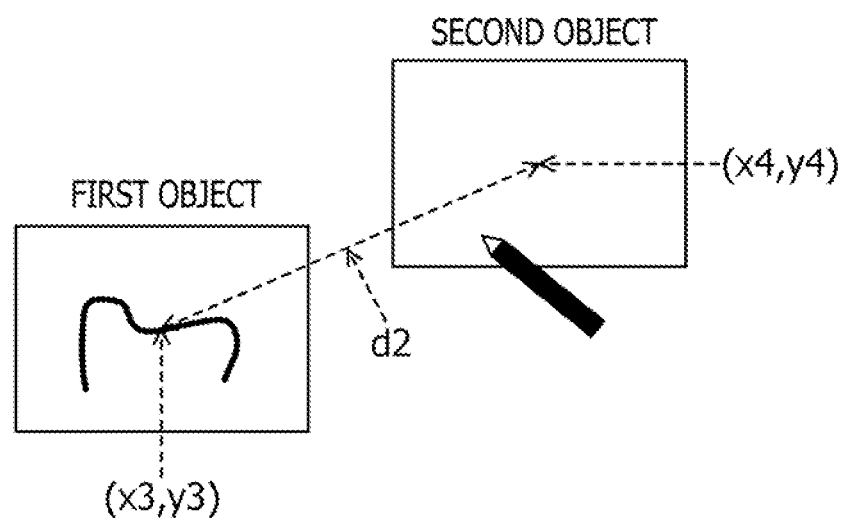
FIG. 8 is a diagram for describing a distance between the first object and the second object.

Specifically, as illustrated in FIG. 8, the determination unit 22 determines whether or not a distance d2 between corresponding positions (center positions in the embodiment) of the first object and the second object is equal to or smaller than a threshold TH3 (for example, 30 cm). The distance d2 is calculated according to the following Expression (2). In Expression (2), x3 and y3 represent an x coordinate and a y coordinate of the center position of the first object, and x4 and y4 represent an x coordinate and a y coordinate of the center position of the second object.

$$d2=\sqrt{(y4-y3)+(x4-x3)^2} \quad (2)$$

Figure 9:
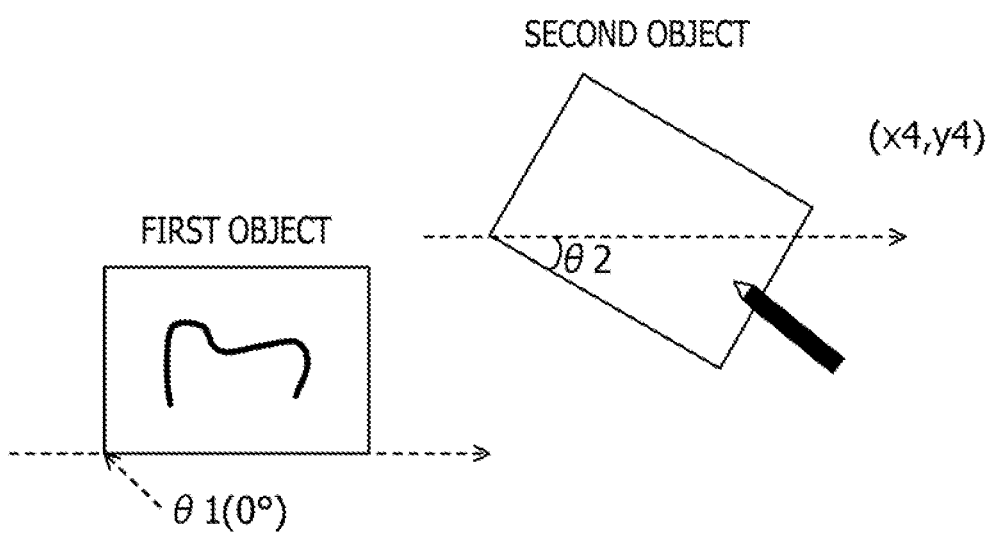
FIG. 9 is a diagram for describing a difference in angle between the first object and the second object.

As illustrated in FIG. 9, the determination unit 22 determines whether or not the absolute value (|θ2−θ1|) of the difference between the angles of the first object and the second object is equal to or smaller than a threshold TH4 (for example, 15°). FIG. 9 illustrates an example in which the angle of one side of the object (long side of the rectangular object in the example of FIG. 9) with respect to the x-axis direction (direction of the broken line arrow of FIG. 9) of the screen is applied as the angle of each object.

Figure 10:
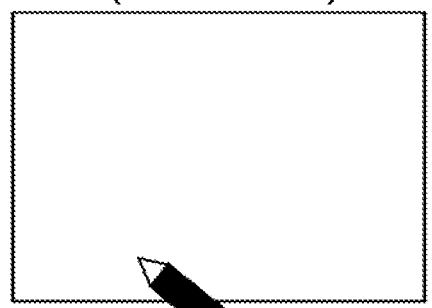
FIG. 10 is a diagram for describing types of the first object and the second object.
Figure 10:
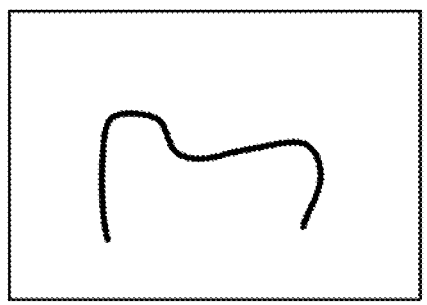

As illustrated in FIG. 10, the determination unit 22 determines whether or not the types of the first object and the second object are the same.

In a case where the distance d2 between of the first object and the second object is equal to or smaller than the threshold TH3, the absolute value of the difference between the angles of the first object and the second object is equal to or smaller than the threshold TH4, and the types of the first object and the second object are the same, the determination unit 22 determines that the relationship between the first object and the second object is within the range R. The determination unit 22 determines to take over the operation setting of the first object determined to be continuously operated and determined that the relationship is within the range R, to the second object. The determination unit 22 may determine that the relationship between the first object and the second object is within the range R when any one of or a combination of two of a case where the distance d2 is equal to or smaller than the threshold TH3, a case where the absolute value of the difference between the angles is equal to or smaller than the threshold TH4, and a case where the types are the same are satisfied. The determination unit 22 may determine to take over the operation setting of the first object determined to be continuously operated or the operation setting of the first object determined that the relationship is within the range R, to the second object.

In a case where the determination unit 22 determines to take over the operation setting of the first object to the second object, the setting unit 24 sets the operation setting of the first object as the operation setting of the second object. For example, in this case, the setting unit 24 overwrites the operation setting of the second object with the operation setting of the first object in the object information table 30. In this case, the setting unit 24 may save the operation setting of the second object before the overwriting of the operation setting, and may restore the operation setting of the second object in the object information table 30 after the operation on the second object is ended.

The display control unit 26 performs control for displaying an object via the display device 14 according to the information stored in the object information table 30. The display control unit 26 performs control for displaying, via the display device 14, a result of the operation on the object performed by the operator which is detected by the detection unit 20, according to the operation setting of the corresponding object in the object information table 30. Under the control of the display control unit 26, the display device 14 performs display by projecting the result of the operation on the object performed by the operator, according to the operation setting of the object.

Figure 11:
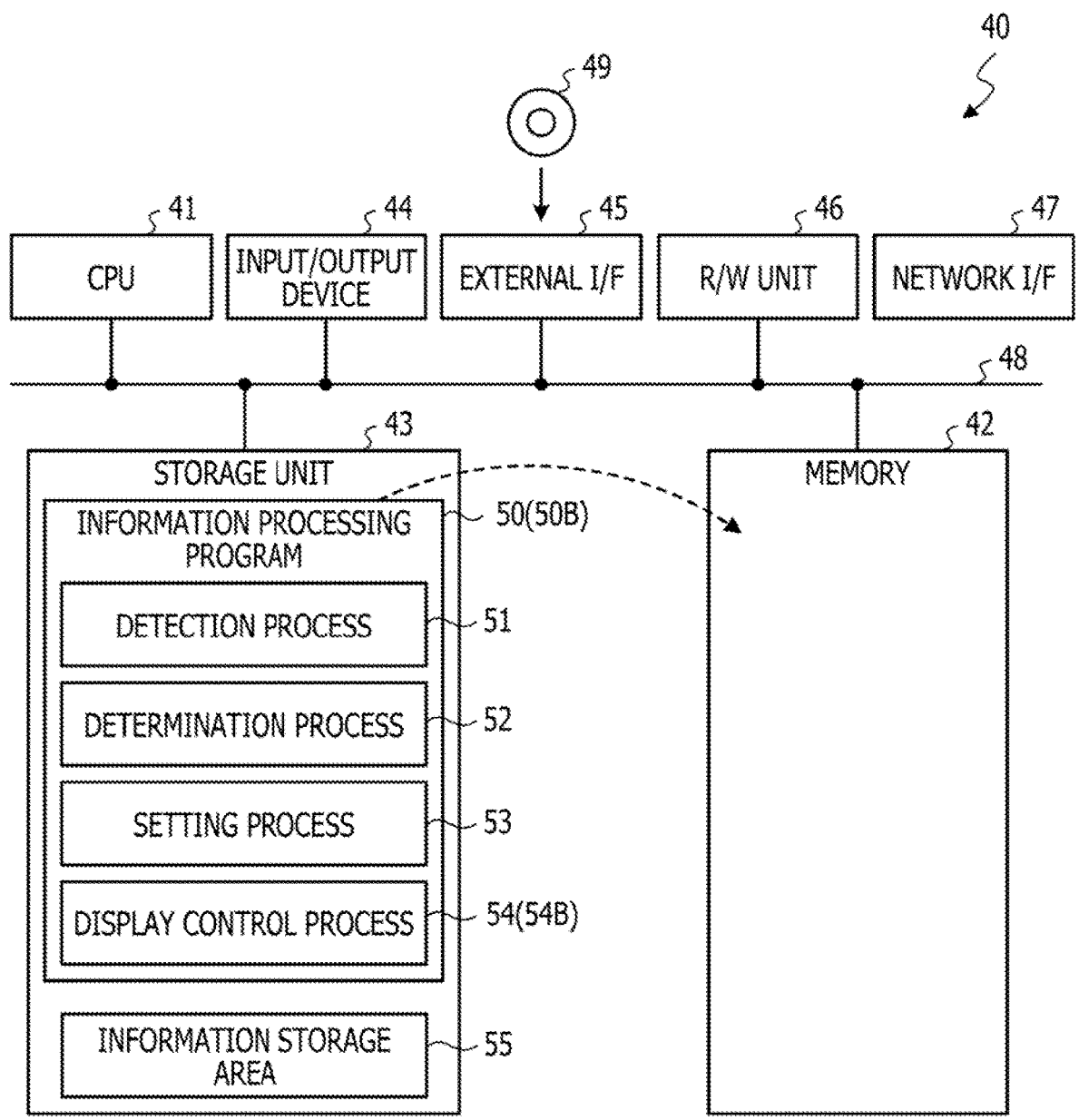
FIG. 11 is a block diagram illustrating a schematic configuration of a computer that functions as the information processing device according to the first and third embodiments.

The information processing device 12 may be achieved, for example, by a computer 40 illustrated in FIG. 11. The computer 40 includes a central processing unit (CPU) 41, a memory 42 serving as a temporary storage area, and a non-volatile storage unit 43. The computer 40 includes an input/output device 44 such as a display device and an input device. The computer 40 also includes an external interface (I/F) 45 to which the display device 14 and the imaging device 16 are coupled. The computer 40 includes a read/write (R/W) unit 46 that controls reading and writing of data from and to a recording medium 49, and a network I/F 47 coupled to a network. The CPU 41, the memory 42, the storage unit 43, the input/output device 44, the external I/F 45, the R/W unit 46, and the network I/F 47 are coupled via a bus 48.

The storage unit 43 may be achieved by a hard disk drive (HDD), a solid-state drive (SSD), a flash memory, or the like. The storage unit 43 as a storage medium stores an information processing program 50 for causing the computer 40 to function as the information processing device 12. The information processing program 50 has a detection process 51, a determination process 52, a setting process 53, and a display control process 54. The storage unit 43 has an information storage area 55 in which the object information table 30 and the operation history table 32 are stored.

The CPU 41 reads the information processing program 50 from the storage unit 43 and loads the information processing program 50 into the memory 42 to execute the processes included in the information processing program 50. The CPU 41 operates as the detection unit 20 illustrated in FIG. 3 by executing the detection process 51. The CPU 41 operates as the determination unit 22 illustrated in FIG. 3 by executing the determination process 52. The CPU 41 operates as the setting unit 24 illustrated in FIG. 3 by executing the setting process 53. The CPU 41 operates as the display control unit 26 illustrated in FIG. 3 by executing the display control process 54. Thus, the computer 40 executing the information processing program 50 functions as the information processing device 12. The CPU 41 that executes the processes included in the information processing program 50 is hardware.

The functions achieved by the information processing program 50 may be achieved by, for example, a semiconductor integrated circuit, more specifically, an application-specific integrated circuit (ASIC) or the like.

Figure 12:
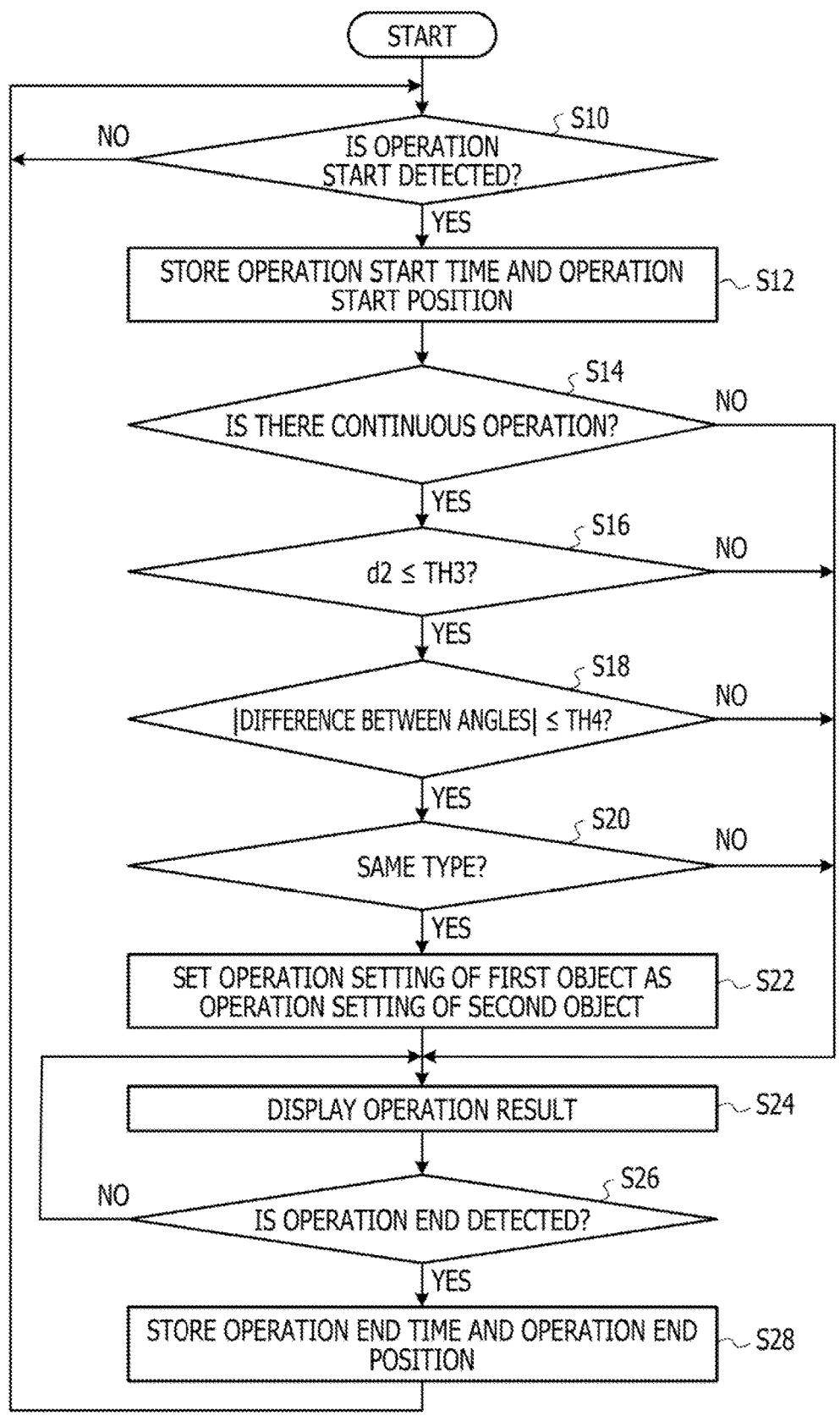
FIG. 12 is a flowchart illustrating an example of setting takeover processing according to the first and third embodiments.

Next, the operation of the information processing device 12 according to the embodiment will be described. The information processing device 12 executes the information processing program 50 to execute the setting takeover processing illustrated in FIG. 12. The setting takeover processing illustrated in FIG. 12 is executed, for example, in a case where the information processing device 12 is powered on or in a case where an instruction to execute the information processing program 50 is input. It is assumed that the setting takeover processing is executed after the object is displayed over the screen.

In step S10 in FIG. 12, the detection unit 20 waits until the operation start time and the operation start position are detected based on the signal input from the imaging device 16. When the detection unit 20 detects the operation start time and the operation start position, the determination in step S10 is affirmative, and the processing proceeds to step S12.

In step S12, the detection unit 20 specifies the object as the operation target based on the operation start position detected by the processing in step S10 and the position and size of the object in the object information table 30. Then, the detection unit 20 stores the ID of the specified object in association with the detected operation start time and the detected operation start position, in the operation history table 32.

In step S14, as described above, the determination unit 22 determines whether or not, before the second object from which the operation start is detected by the processing in step S10, there is the first object that has been continuously operated with the second object. In a case where the determination is negative, the processing proceeds to step S24, and in a case where the determination is affirmative, the processing proceeds to step S16.

In step S16, as described above, the determination unit 22 determines whether or not the distance d2 between the first object and the second object, which are determined to be continuously operated by the processing in step S14, is equal to or smaller than the threshold TH3. In a case where the determination is negative, the processing proceeds to step S24, and in a case where the determination is affirmative, the processing proceeds to step S18.

In step S18, as described above, the determination unit 22 determines whether or not the absolute value of the difference between the angles of the first object and the second object, which are determined to be continuously operated by the processing in step S14, is equal to or smaller than the threshold TH4. In a case where the determination is negative, the processing proceeds to step S24, and in a case where the determination is affirmative, the processing proceeds to step S20.

In step S20, as described above, the determination unit 22 determines whether or not the types of the first object and the second object, which are determined to be continuously operated by the processing in step S14, are the same. In a case where the determination is negative, the processing proceeds to step S24, and in a case where the determination is affirmative, the processing proceeds to step S22.

In step S22, as described above, the setting unit 24 sets the operation setting of the first object as the operation setting of the second object. In step S24, the display control unit 26 performs, by referring to the object information table 30, control for displaying the operation result according to the trajectory of the operation on the object performed by the operator, according to the operation setting of the object from which the operation start is detected by the processing in step S10.

In step S26, the detection unit 20 determines whether or not the operation end time and the operation end position are detected based on the signal input from the imaging device 16. In a case where the determination is negative, the processing returns to step S24, and in a case where the determination is affirmative, the processing proceeds to step S28.

In step S28, the detection unit 20 stores the operation end time and the operation end position detected by the processing in step S26 in association with the ID of the object specified by the processing in step S12, in the operation history table 32. When the processing in step S28 is ended, the processing returns to step S10. The setting takeover processing illustrated in FIG. 12 is ended, for example, in a case where the information processing device 12 is powered off or in a case where an instruction to end the information processing program 50 is input.

As described above, according to the embodiment, in a case where the first object and the second object are continuously operated and the relationship therebetween is within the range R, the operation setting of the first object is set as the operation setting of the second object. Therefore, the operation setting may be taken over between the objects without using equipment for specifying the operator.

According to the embodiment, in a case where the time interval t is equal to or smaller than the threshold TH1 and the distance d1 is equal to or smaller than the threshold TH2, it is determined that the first object and the second object are continuously operated. According to the embodiment, in a case where the distance d2 is equal to or smaller than the threshold TH3, the absolute value of the difference between the angles is equal to or smaller than the threshold TH4, and the types of the objects are the same, it is determined that the relationship between the first object and the second object is within the range R. Therefore, it is possible to accurately determine whether or not the first object and the second object are operated by the same operator.

Second Embodiment

A second embodiment of the disclosed technique will be described. The configuration of the information processing system 10 according to the embodiment is the same as that of the first embodiment, and therefore description thereof is omitted.

Figure 13:
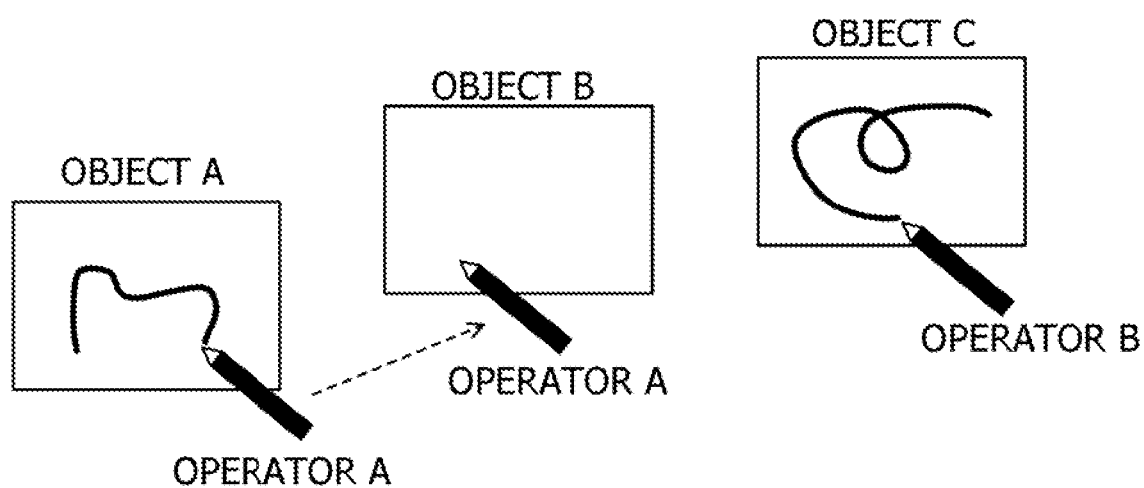
FIG. 13 is a diagram for describing an example in which there are a plurality of first objects.

In the embodiment, a form example of a case where there are a plurality of first objects as the takeover source, of which the operation setting is taken over by the second object will be described. As illustrated in FIG. 13, examples of such a situation include a case where an operator A performs an operation on an object A, an operator B performs an operation on an object C, and those operations are ended at substantially the same time. In this case, for example, when the operator A starts an operation on an object B immediately after the end of the operation on the object A, it is determined that the object A and the object B are continuously operated and the object C and the object B are continuously operated. It is further assumed that the relationship between the object A and the object B is within the range R, and the relationship between the object B and the object C is within the range R.

In this case, the first object determined as the takeover source of which the operation setting is taken over by the object B as the second object, is two of the object A and the object C. In such a case, an information processing device 12A according to the embodiment has a function of deciding which of the object A and the object C the operation setting of the object is to be taken over by the object B. The number of first objects is not limited to two, and may be three or more.

Figure 14:
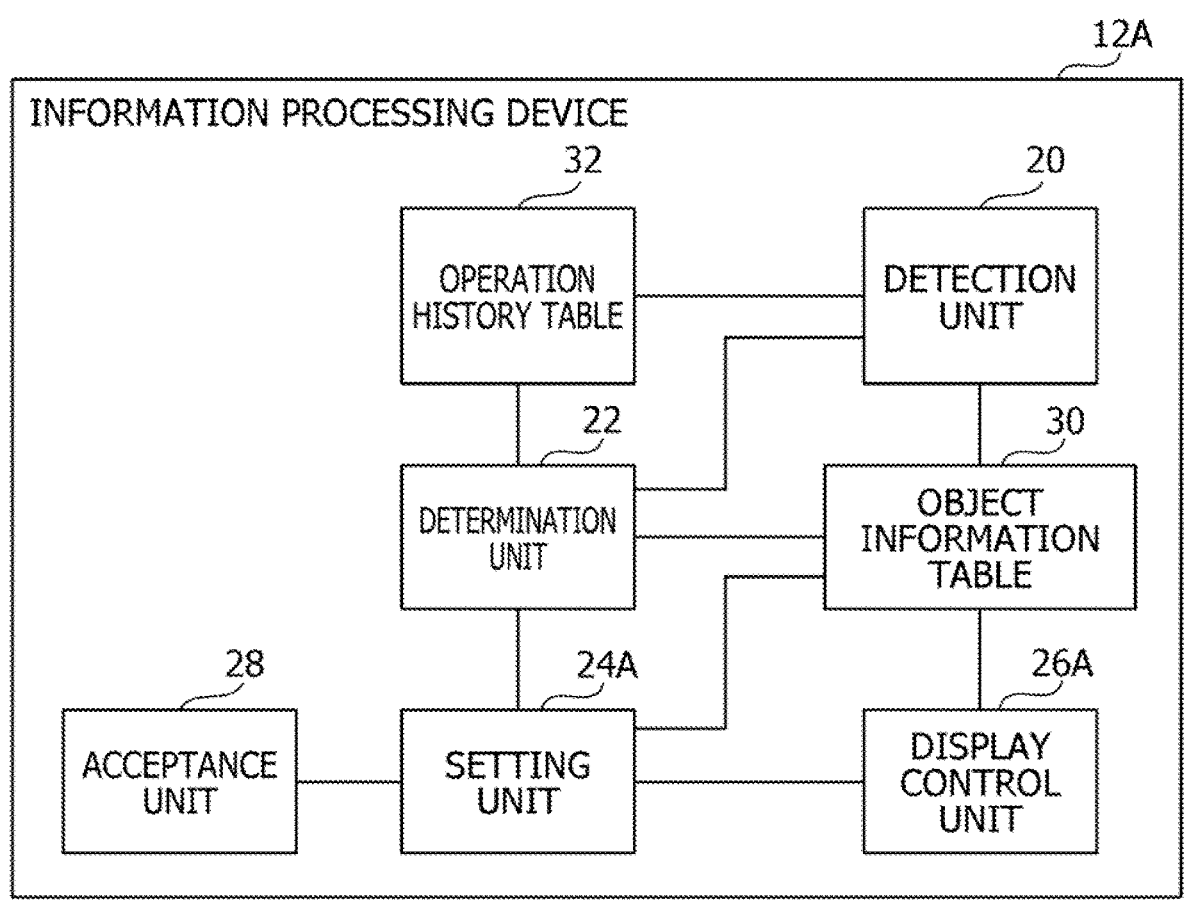
FIG. 14 is a functional block diagram of an information processing device according to a second embodiment.

With reference to FIG. 14, a functional configuration of the information processing device 12A according to the embodiment will be described. The functional units having the same functions as the functional units of the information processing device 12 according to the first embodiment are denoted by the same reference numerals and description thereof is omitted. As illustrated in FIG. 14, the information processing device 12A includes the detection unit 20, the determination unit 22, a setting unit 24A, a display control unit 26A, and an acceptance unit 28.

The display control unit 26A has the following functions in addition to the functions of the display control unit 26 according to the first embodiment. In a case where there are a plurality of first objects determined by the determination unit 22 that the operation setting thereof is taken over by the second object, the display control unit 26A performs control for displaying the operation setting of each of the plurality of first objects, by referring to the object information table 30. For example, as illustrated in FIG. 15, the display control unit 26A performs control for displaying, on the second object, information representing the operation setting of each of the plurality of first objects.

Figure 15:
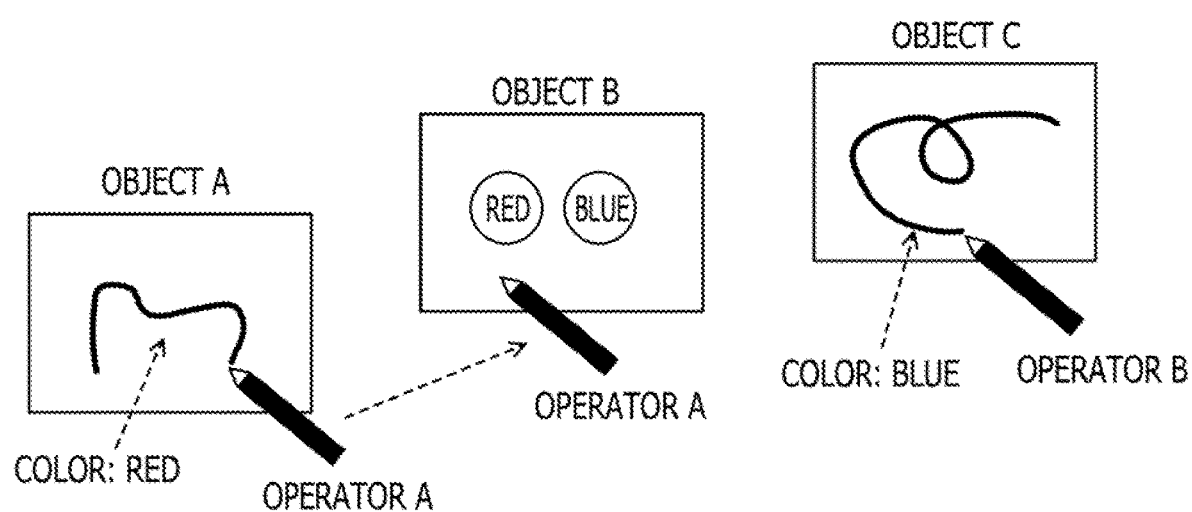
FIG. 15 is a diagram for describing processing of displaying the operation setting of each of the first objects.

FIG. 15 illustrates an example of a case where the object A and the object C are the first objects and the object B is the second object. FIG. 15 illustrates an example of a case where the color included in the operation setting of the object A is red and the color included in the operation setting of the object C is blue.

The operator selects the operation setting to be used by the operator from the displayed operation setting of each of the plurality of first objects. For example, in FIG. 15, the operator A selects "red". The acceptance unit 28 accepts the operation setting selected by the operator.

The setting unit 24A has the following functions in addition to the functions of the setting unit 24 according to the first embodiment. The setting unit 24A sets the operation setting accepted by the acceptance unit 28 as the operation setting of the second object.

Figure 16:
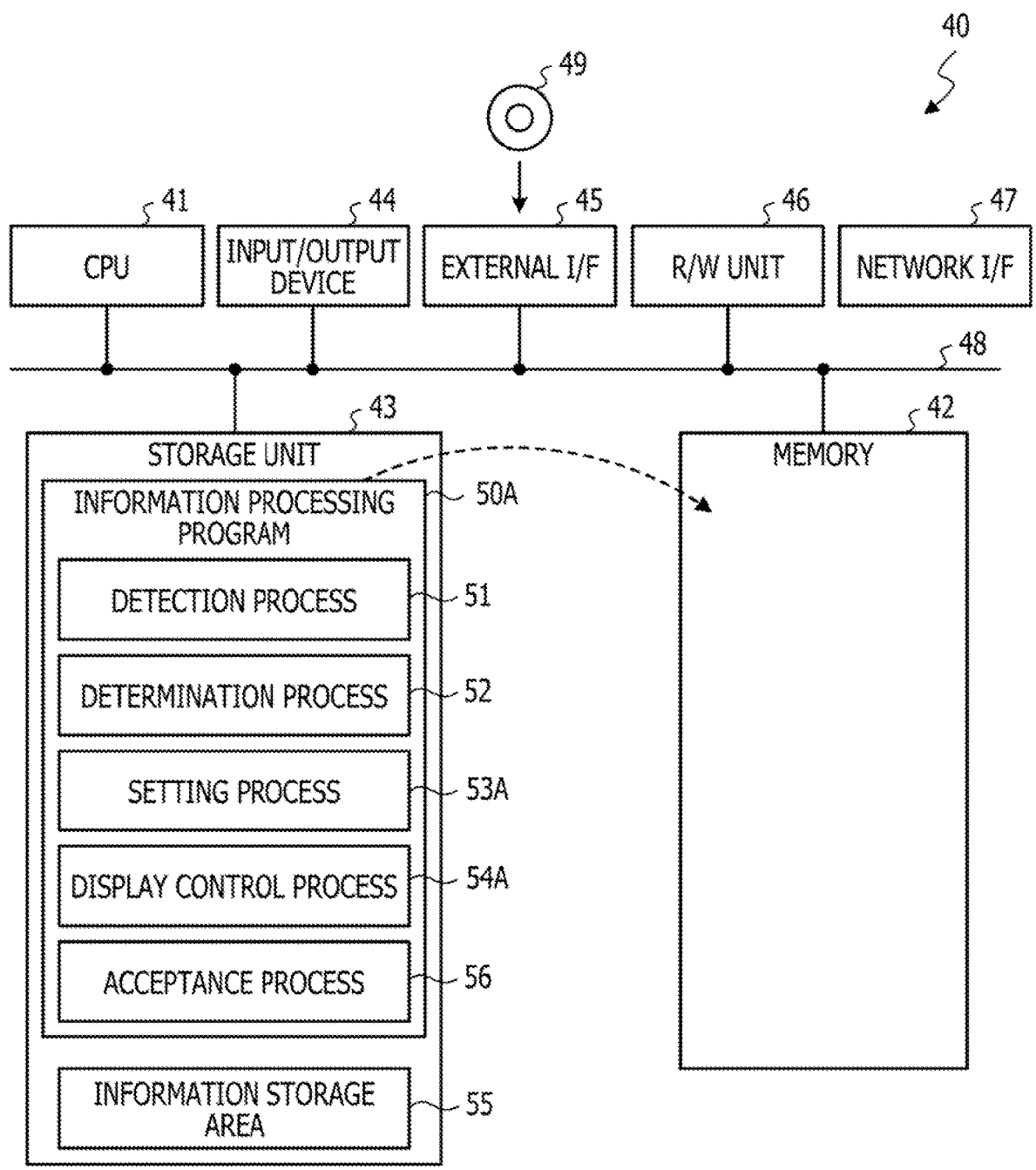
FIG. 16 is a block diagram illustrating a schematic configuration of a computer that functions as the information processing device according to the second embodiment.

The information processing device 12A may be achieved, for example, by the computer 40 illustrated in FIG. 16. In FIG. 16, the same elements as those in FIG. 11 are denoted by the same reference numerals, and the description thereof is omitted. The storage unit 43 of the computer 40 stores an information processing program 50A for causing the computer 40 to function as the information processing device 12A. The information processing program 50A has the detection process 51, the determination process 52, a setting process 53A, a display control process 54A, and an acceptance process 56.

The CPU 41 reads the information processing program 50A from the storage unit 43 and loads the information processing program 50A into the memory 42 to execute the processes included in the information processing program 50A. The CPU 41 operates as the detection unit 20 illustrated in FIG. 14 by executing the detection process 51. The CPU 41 operates as the determination unit 22 illustrated in FIG. 14 by executing the determination process 52. The CPU 41 operates as the setting unit 24A illustrated in FIG. 14 by executing the setting process 53A. The CPU 41 operates as the display control unit 26A illustrated in FIG. 14 by executing the display control process 54A. The CPU 41 operates as the acceptance unit 28 illustrated in FIG. 14 by executing the acceptance process 56. Thus, the computer 40 executing the information processing program 50A functions as the information processing device 12A. The CPU 41 that executes the processes included in the information processing program 50A is hardware.

The functions achieved by the information processing program 50A may be achieved by, for example, a semiconductor integrated circuit, more specifically, an ASIC or the like.

Figure 17:
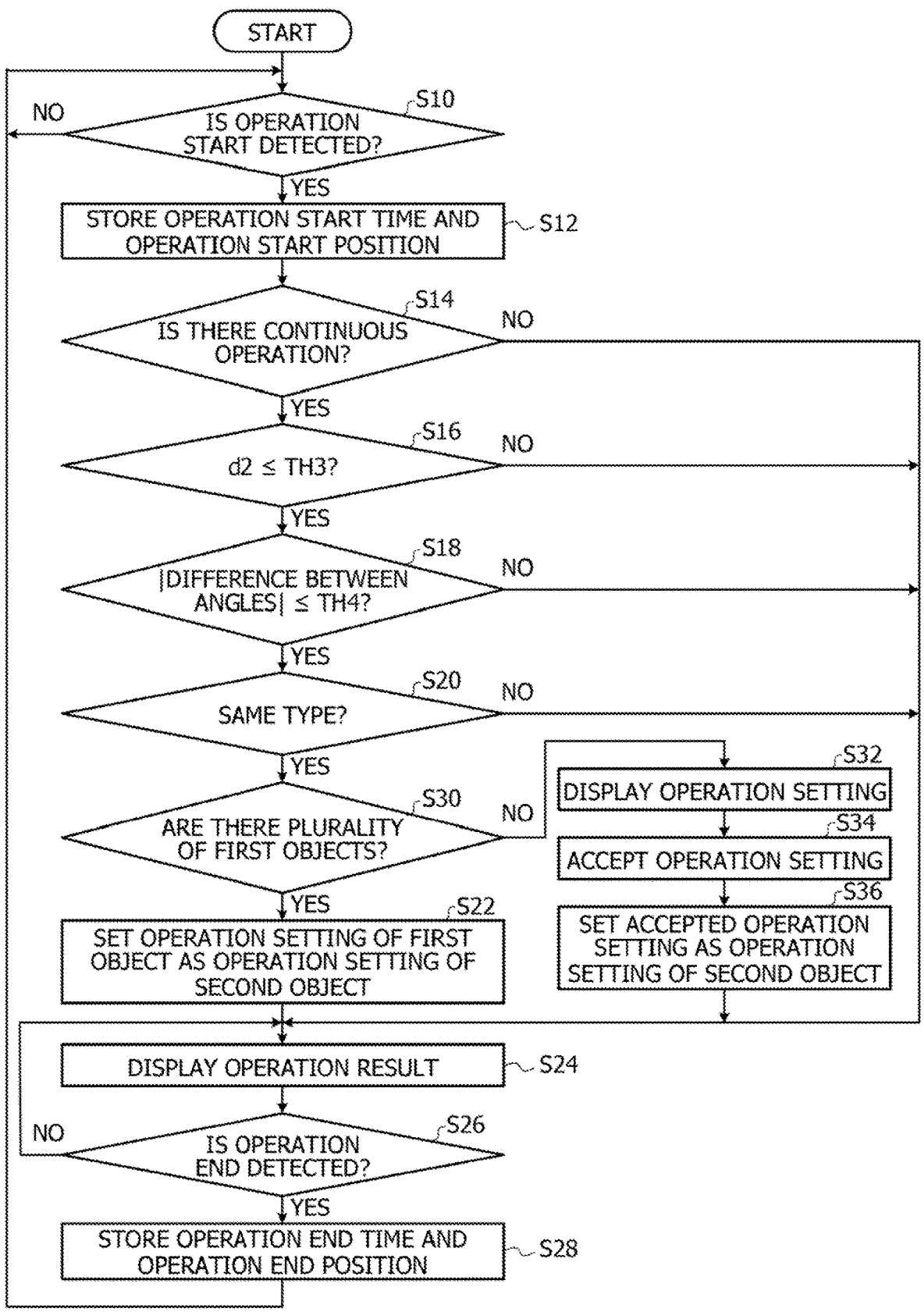
FIG. 17 is a flowchart illustrating an example of setting takeover processing according to the second embodiment.

Next, the operation of the information processing device 12A according to the embodiment will be described. The information processing device 12A executes the information processing program 50A to execute the setting takeover processing illustrated in FIG. 17. The setting takeover processing illustrated in FIG. 17 is executed, for example, in a case where the information processing device 12A is powered on or in a case where an instruction to execute the information processing program 50A is input. It is assumed that the setting takeover processing is executed after the object is displayed over the screen. In FIG. 17, the steps executing the same processing as in FIG. 12 are denoted by the same reference numerals, and the description thereof is omitted.

In a case where the determination in step S20 of FIG. 17 is affirmative, the processing proceeds to step S30. In step S30, the display control unit 26A determines whether or not there are a plurality of first objects which are determined to be continuously operated with the second object, to have the distance d2 equal to or smaller than the threshold TH3, to have the absolute value of the difference between the angles equal to or smaller than the threshold TH4, and to be the same type as the second object. In a case where the determination is negative, the processing proceeds to step S32, and in a case where the determination is affirmative, the processing proceeds to step S22.

In step S32, as described above, the display control unit 26A performs control for displaying the operation setting of each of the plurality of first objects by referring to the object information table 30. The operator selects the operation setting to be used by the operator from the operation setting of each of the plurality of first objects displayed by the processing of step S32. In step S34, the acceptance unit 28 accepts the operation setting selected by the operator.

In step S36, the setting unit 24A sets the operation setting accepted by the processing of step S34 as the operation setting of the second object. When the processing of step S36 is ended, the processing proceeds to step S24.

As described above, according to the embodiment, the same effects as those in the first embodiment may be obtained. According to the embodiment, the operation setting of each of the plurality of first objects are displayed, the operation setting selected by the operator are accepted, and the accepted operation setting is set as the operation setting of the second object. Therefore, even in a case where there are a plurality of first objects, an appropriate operation setting may be set for the second object.

Figure 18:
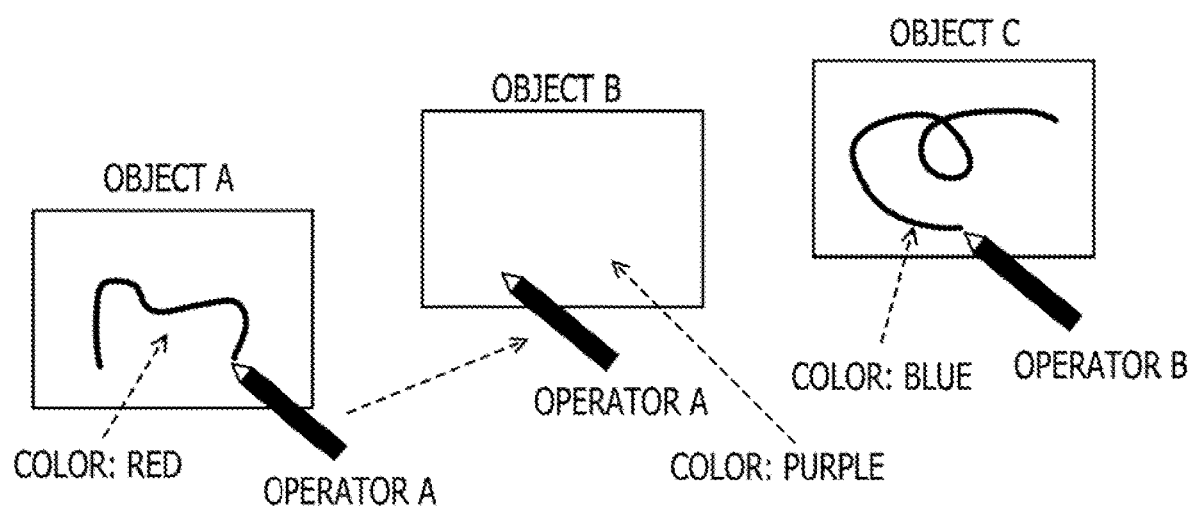
FIG. 18 is a diagram for describing a modification example in a case where there are a plurality of first objects.

As illustrated in FIG. 18, in a case where there are a plurality of first objects, the setting unit 24A may set an operation setting between (for example, intermediate) the operation settings of the plurality of first objects as the operation setting of the second object. FIG. 18 illustrates an example of a case where the object A and the object C are the first objects and the object B is the second object. FIG. 18 illustrates an example of a case where the color included in the operation setting of the object A is red and the color included in the operation setting of the object C is blue. FIG. 18 illustrates an example in which the setting unit 24 sets purple, which is an intermediate color between red and blue, as the operation setting of the object B.

The setting unit 24 may set the operation setting of the first object having the shortest distance d1 or d2 among the plurality of first objects, as the operation setting of the second object. The setting unit 24 may set the operation setting of the first object having the shortest time interval t among the plurality of first objects, as the operation setting of the second object.

Third Embodiment

A third embodiment of the disclosed technique will be described. The configuration of the information processing system 10 according to the embodiment is the same as that of the first embodiment, and therefore description thereof is omitted. In the embodiment, a form example in which the range R is displayed in an identifiable manner during the operation on the first object will be described.

With reference to FIG. 3, a functional configuration of the information processing device 12B according to the embodiment will be described. The functional units having the same functions as the functional units of the information processing device 12 according to the first embodiment are denoted by the same reference numerals and description thereof is omitted. As illustrated in FIG. 3, the information processing device 12B includes the detection unit 20, the determination unit 22, the setting unit 24, and a display control unit 26B.

Figure 19:
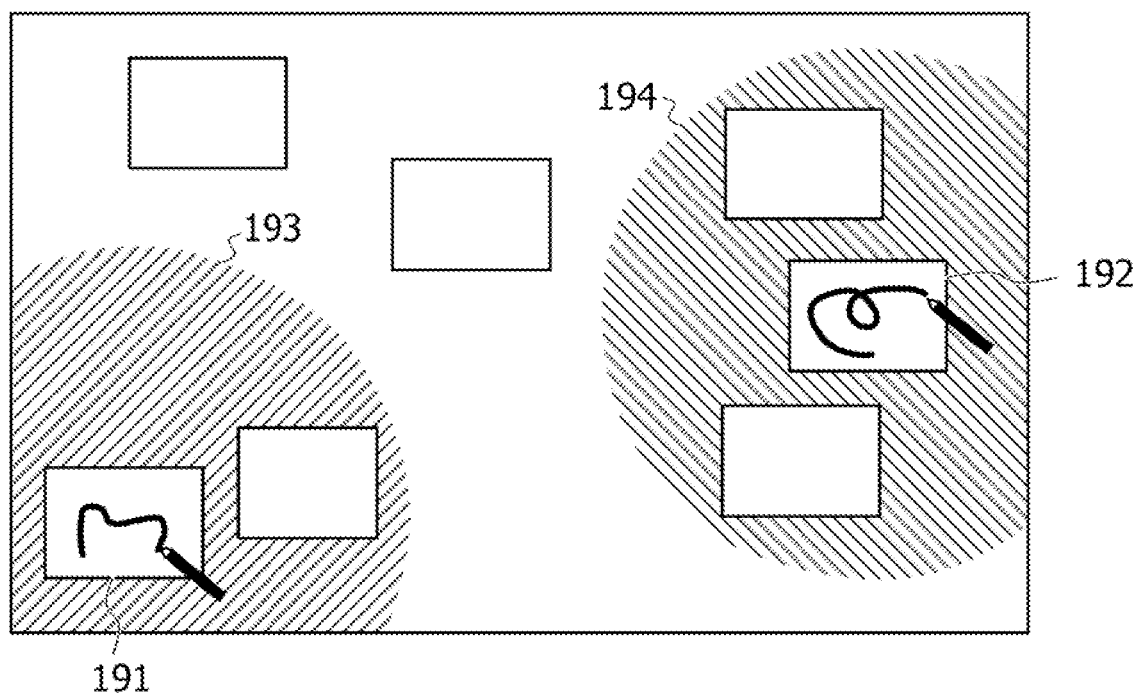
FIG. 19 is a diagram for describing processing of displaying a range in which a relationship corresponding to the first objects being operated is close.

The display control unit 268 has the following functions in addition to the functions of the display control unit 26 according to the first embodiment. The display control unit 26B performs control for displaying the range R corresponding to the first object in an identifiable manner during the operation on the first object. For example, as illustrated in FIG. 19 as an example, the display control unit 26B performs control for displaying, in a shaded manner, a region (193, 194) where the distance from the center position of the first object (191, 192) being operated is within the range of the threshold TH3.

The display control unit 268 may specify, with respect to the first object being operated, a second object which has the distance d2 equal to or smaller than the threshold TH3, has the absolute value of the difference between the angles equal to or smaller than the threshold TH4, and is the same type. In this case, a form in which the display control unit 26B displays the specified second object in a color different from that of the first object, a form in which the display control unit 268 displays the specified second object in a blinking manner, and the like are exemplified.

The information processing device 128 may be achieved, for example, by the computer 40 illustrated in FIG. 11. The storage unit 43 of the computer 40 stores an information processing program 50B for causing the computer 40 to function as the information processing device 12B. The information processing program 50B has the detection process 51, the determination process 52, the setting process 53, and a display control process 54B.

The CPU 41 reads the information processing program SOB from the storage unit 43 and loads the information processing program 508 into the memory 42 to execute the processes included in the information processing program SOB. The CPU 41 operates as the detection unit 20 illustrated in FIG. 3 by executing the detection process 51. The CPU 41 operates as the determination unit 22 illustrated in FIG. 3 by executing the determination process 52. The CPU 41 operates as the setting unit 24 illustrated in FIG. 3 by executing the setting process 53. The CPU 41 operates as the display control unit 26B illustrated in FIG. 3 by executing the display control process 548. Thus, the computer 40 executing the information processing program 50B functions as the information processing device 12B. The CPU 41 that executes the processes included in the information processing program 50B is hardware.

The functions achieved by the information processing program 50B may be achieved by, for example, a semiconductor integrated circuit, more specifically, an ASIC or the like.

Figure 20:
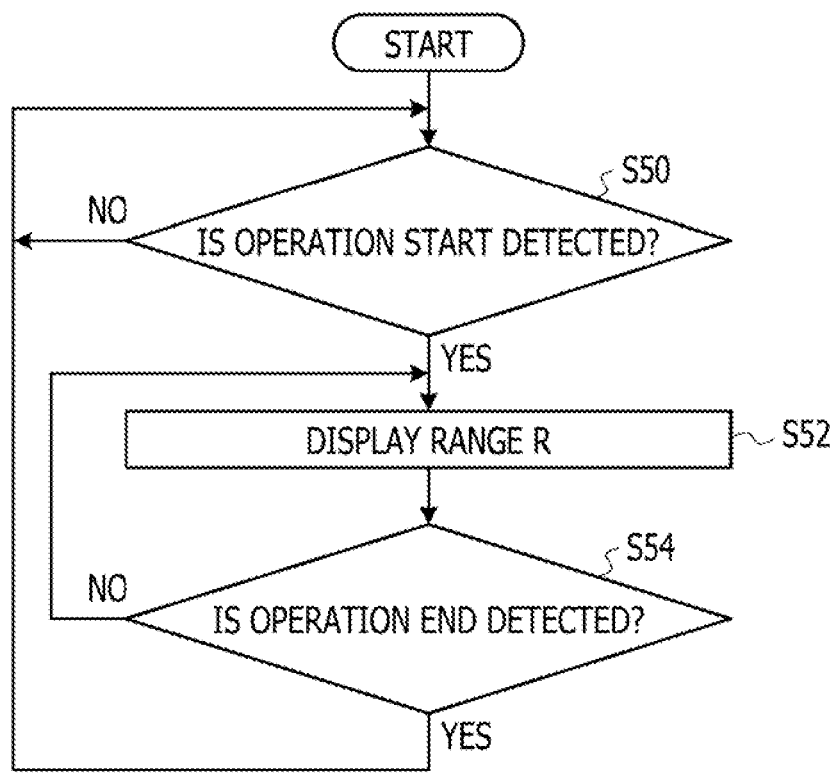
FIG. 20 is a flowchart illustrating an example of range display processing according to the third embodiment.

Next, the operation of the information processing device 12B according to the embodiment will be described. The information processing device 12B executes the information processing program SOB to execute the range display processing illustrated in FIG. 20. The range display processing illustrated in FIG. 20 is executed, for example, in a case where the information processing device 12B is powered on or in a case where an instruction to execute the information processing program SOB is input. It is assumed that the range display processing is executed after the object is displayed over the screen. The setting takeover processing according to the embodiment is the same as the setting takeover processing according to the first embodiment illustrated in FIG. 12, and therefore the description thereof is omitted.

In step S50 in FIG. 20, the detection unit 20 waits until the operation start time and the operation start position are detected based on the signal input from the imaging device 16. When the detection unit 20 detects the operation start time and the operation start position, the determination in step S50 is affirmative, and the processing proceeds to step S52.

In step S52, as described above, the display control unit 26B performs control for displaying, in an identifiable manner, the range R corresponding to the first object of which the operation start is detected by the processing in step S50.

In step S54, the detection unit 20 determines whether or not the operation end time and the operation end position are detected based on the signal input from the imaging device 16. In a case where the determination is negative, the processing returns to step S52, and in a case where the determination is affirmative, the processing returns to step S50. The range display processing illustrated in FIG. 20 is ended, for example, in a case where the information processing device 128 is powered off or in a case where an instruction to end the information processing program 50B is input.

As described above, according to the embodiment, the range R is displayed in an identifiable manner during the operation on the first object. Therefore, during the operation on the first object, the operator may recognize the second object to which the operation setting of the first object is taken over.

In each of the embodiments described above, the case of determining whether or not the relationship between the first object and the second object, which are determined to be continuously operated, is within the range R has been described, but the disclosed technique is not limited thereto. For example, a form of determining whether or not the first object and the second object, which are determined that the relationship is within the range R, are continuously operated may be adopted.

Figure 21:
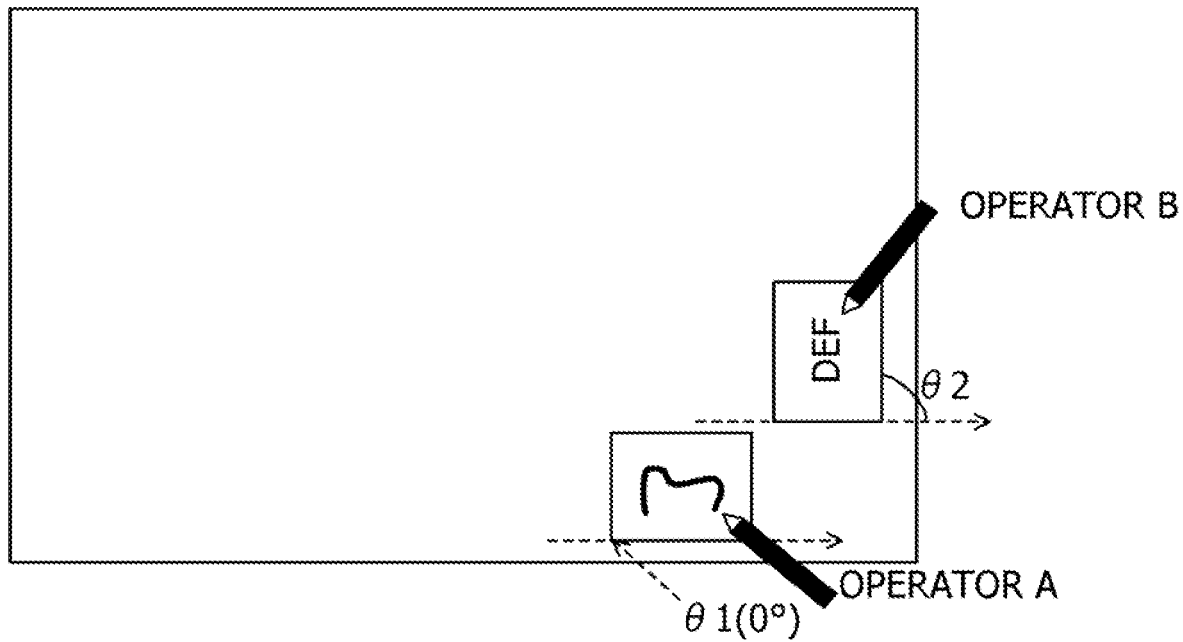
FIG. 21 is a diagram for describing an effect of using the difference in angle between the first object and the second object.

In each of the embodiments described above, a case where the operation setting of the first object is taken over by the second object when it is determined that the operation is continuously performed and the relationship is within the range R has been described, but the disclosed technique is not limited thereto. For example, a form may be adopted in which the operation setting of the first object is taken over by the second object when any condition of a case where it is determined that the operation is continuously performed, and a case where it is determined that the relationship is within the range R. In this form example, it is preferable that both the time interval t and the distance d1 are used for determining whether or not the operation is continuously performed. In this form example, it is preferable that at least the distance d2 is used for determining whether or not the relationship is within the range R. In a case where the display surface is a surface along the horizontal direction such as the upper surface of the top plate of the desk, it is preferable that the absolute value of the difference between the angles is used for determining whether or not the relationship is within the range R. As illustrated in FIG. 21 as an example, in a case where the operators A and B at the positions facing the adjacent sides of the display surface operate the objects in the directions facing the operators A and B themselves, it is possible to suppress that the operation setting is taken over between the objects.

In each of the embodiments described above, the threshold TH3 may be set to a larger value as the operation time for the first object is longer. In this case, the upper limit value of the threshold TH3 may be determined according to the restriction such as the movement of the body of the operator (for example, reachable range by the hand).

In each of the embodiments described above, the threshold TH3 may be set to a larger value as the angle of the screen with respect to the vertical direction is smaller. In a case where the screen is displayed on a surface along the vertical direction such as a wall, the movable range of the operator is often larger than in a case where the screen is displayed on a surface along the horizontal direction such as the upper surface of the top plate of the desk. Therefore, a form is exemplified in which, in a case where the screen is along the vertical direction, the threshold TH3 is set to be larger than in a case where the screen is along the horizontal direction.

In each of the embodiments described above, the display device 14 may be a touch panel display in which a touch panel and a display unit are integrated. In this case, the information processing system 10 may not include the imaging device 16. In this case, the touch panel of the touch panel display corresponds to the detection device of the disclosed technique, and the display unit of the touch panel display corresponds to the display device of the disclosed technique.

In each of the embodiments described above, a mode in which the information processing program 50, 50A, or 50B is stored (installed) in advance in the storage unit 43 has been described, but the disclosed technique is not limited thereto. The information processing program 50, 50A, or 50B may be provided in a form of being recorded in a recording medium such as a compact disc read-only memory (CD-ROM), a Digital Versatile Disc (DVD)-ROM, a Universal Serial Bus (USB) memory, or a memory card.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory, and
a processor coupled to the memory and configured to:
determine, among a plurality of objects which are arranged over a screen and are operable by a plurality of operators, whether a first object and a second object operated after the first object are continuously operated and whether a positional relationship between the first object and the second object is within a predetermined range; and
set an operation setting of a writing operation on the first object as an operation setting of a writing operation on the second object in a case where the first object and the second object are operated continuously and the positional relationship is within the predetermined range,
the positional relationship is determined to be within the range in a case where a distance between corresponding positions of the first object and the second object is equal to or smaller than a threshold.

2. The information processing apparatus according to claim 1, wherein the relationship is determined to be within the range in a case where an absolute value of a difference between angles of the first object and the second object is equal to or smaller than a threshold.

3. The information processing apparatus according to claim 1, wherein the relationship is determined to be within the range in a case where types of the first object and the second object are of a same type.

4. The information processing apparatus according to claim 1, wherein the first object and the second object are determined to be continuously operated in a case where a time interval between an end of an operation on the first object and a start of an operation on the second object is equal to or smaller than a threshold.

5. The information processing apparatus according to claim 1, wherein the first object and the second object are determined to be continuously operated in a case where a distance between a position where an operation on the first object is ended and a position where an operation on the second object is started is equal to or smaller than a threshold.

6. The information processing apparatus according to claim 1, the processor further configured to display the predetermined range over the screen, during the operation on the first object.

7. The information processing apparatus according to claim 1, the processor further configured to:
display, in a case where there are a plurality of first objects for which the operations are determined to be continuously performed or the relationships are determined to be within the predetermined range, the operation setting of each of the plurality of first objects; and
accept one of the displayed operation settings selected by one of the plurality of operators, and
set the accepted operation setting as the operation setting of the second object.

8. The information processing apparatus according to claim 1, the processor further configured to set, in a case where there are a plurality of first objects for which the operations are determined to be continuously performed or the relationships are determined to be within the predetermined range, an operation setting between the operation settings of the plurality of first objects as the operation setting of the second object.

9. The information processing apparatus according to claim 1, wherein the operation setting includes a color and thickness of a line to be written to an object.

10. A non-transitory computer-readable storage medium having stored a program for causing a computer to perform a process comprising:
determining, among a plurality of objects which are arranged over a screen and are operable by a plurality of operators, whether a first object and a second object operated after the first object are continuously operated, or whether a positional relationship between the first object and the second object is within a predetermined range; and
setting an operation setting of a writing operation on the first object as an operation setting of a writing operation on the second object in a case where the first object and the second object are operated continuously and the positional relationship is within the predetermined range,
the positional relationship is determined to be within the range in a case where a distance between corresponding positions of the first object and the second object is equal to or smaller than a threshold.

11. The storage medium according to claim 10, wherein the relationship is determined to be within the range in a case where an absolute value of a difference between angles of the first object and the second object is equal to or smaller than a threshold.

12. The storage medium according to claim 10, wherein the relationship is determined to be within the range in a case where types of the first object and the second object are of a same type.

13. The storage medium according to claim 10, wherein the first object and the second object are determined to be continuously operated in a case where a time interval between an end of an operation on the first object and a start of an operation on the second object is equal to or smaller than a threshold.

14. The storage medium according to claim 10, wherein the first object and the second object are determined to be continuously operated in a case where a distance between a position where an operation on the first object is ended and a position where an operation on the second object is started is equal to or smaller than a threshold.

15. The storage medium according to claim 10, the process further comprising displaying the predetermined range over the screen, during the operation on the first object.

16. The storage medium according to claim 10, the process further comprising:
displaying, in a case where there are a plurality of first objects for which the operations are determined to be continuously performed or the relationships are determined to be within the predetermined range, the operation setting of each of the plurality of first objects; and accepting one of the operation settings selected by one of the plurality of operators, and setting the accepted operation setting as the operation setting of the second object.

17. The storage medium according to claim 10, the process further comprising setting, in a case where there are a plurality of first objects for which the operations are determined to be continuously performed or the relationships are determined to be within the predetermined range, an operation setting between the operation settings of the plurality of first objects as the operation setting of the second object.

18. The storage medium according to claim 10, wherein the operation setting includes a color and thickness of a line to be written to an object.

* * * * *